United States Patent [19]
Welch

[11] Patent Number: 5,853,036
[45] Date of Patent: Dec. 29, 1998

[54] CONTOURED MOLDING CUTTING APPARATUS

[76] Inventor: Robert S. Welch, 2716 Savannah, El Paso, Tex. 79930

[21] Appl. No.: 966,905

[22] Filed: Nov. 7, 1997

[51] Int. Cl.⁶ .................................. B27C 5/02; B27C 5/10
[52] U.S. Cl. ..................................... 144/154.5; 144/136.1; 144/137; 409/182
[58] Field of Search ............................ 144/136.1, 136.95, 144/137, 154.5, 371; 409/178, 180, 181, 182, 183

[56] References Cited

U.S. PATENT DOCUMENTS

| | | |
|---|---|---|
| 2,663,331 | 12/1953 | Herder . |
| 2,990,861 | 7/1961 | Macks et al. ............................ 144/136 |
| 3,254,685 | 6/1966 | Hawkins . |
| 4,290,464 | 9/1981 | Marsan ............................... 144/136.95 |
| 4,355,557 | 10/1982 | Mecsey ...................................... 83/565 |
| 4,617,737 | 10/1986 | Jung ............................................ 30/273 |
| 4,655,653 | 4/1987 | Hall et al. ................................. 409/182 |
| 4,742,856 | 5/1988 | Hehr et al. ............................. 144/154.5 |
| 4,880,042 | 11/1989 | Schafferkotter ....................... 144/154.5 |
| 4,949,464 | 8/1990 | Adomatis .................................. 30/509 |
| 5,136,904 | 8/1992 | Peters ........................................... 83/13 |
| 5,363,732 | 11/1994 | Heasley .................................. 83/471.2 |
| 5,369,887 | 12/1994 | Keevers .................................... 30/394 |
| 5,388,334 | 2/1995 | Halsey ...................................... 30/509 |

*Primary Examiner*—W. Donald Bray
*Attorney, Agent, or Firm*—Miller, Sisson, Chapman & Nash, P.C.

[57] ABSTRACT

A work piece cutting apparatus for cutting profiles on the angular end of contoured molding sections. A system having a block and table allowing for fine, precision, longitudinal and transverse movements of a cutting member to impart angular cuts to the molding section. The cuts result in a profile corresponding to the molding contour enabling the cut work piece to interconnect in a smooth, flush-fitting corner joint. No template is required.

7 Claims, 4 Drawing Sheets

CONTOURED MOLDING CUTTING APPARATUS

BACKGROUND OF THE INVENTION

The present invention relates to an apparatus for cutting a work piece. More particularly, the invention is a cutting apparatus for the edge of a piece of contoured molding to correspond to the configuration of the molding. No template is required.

Existing procedures to form a properly fitting corner joint with trim strips for chairs, baseboards, or crown molding are extremely time consuming; particularly when the cut is hand made. There have been devices developed which enable the carpenter or workman to prepare profile of the contour shape for corner joints, but these generally require expensive and complex machinery and the use of templates to follow the contour. Such a device is disclosed in U.S. Pat. No. 4,355,557.

For the skilled craftsman, matching the contours of two pieces of crown molding in a corner joint is part of the art in his or her job. Complex templates are not necessary, but the craftsman is able to considerably reduce the cut time if a power cutting machine may be used. The present invention allows the workman to use a power cutting tool while manually following the contour and producing the profiled edge. Further, the present invention enables the work piece to be secured. The workman makes a series of fine longitudinal and transverse movements of the cutting tool to follow the molding contour and achieve the proper profile. A reasonable explanation of the profile cutting is described in U.S. Pat. No. 5,136,904.

SUMMARY OF THE INVENTION

The present invention is a work piece cutting apparatus having a base plate, a first block guide bracket disposed at a first lateral side of the base plate, and a second block guide bracket disposed at a second, opposite lateral side of the base plate. A block member is longitudinally slidable across the base plate between the first and second brackets. A second pair of table guide brackets are disposed at a third and fourth, opposing sides of the block with a table transversely slidable between the table guide brackets. An angular adjustment mounting bracket is affixed transversely across a central portion of the table and supports a detachably mountable cutting member having a generally downwardly depending blade. A work piece holder assembly is disposed at the first lateral side of the base plate and supports a clamping member which in turn detachably secures a work piece. By making precise longitudinal and transverse movements of the cutting member angular cuts may be imparted to the work piece.

The present invention further has a table retraction mechanism which urges the table back to a first starting position and serves to counterbalance forward forces applied to the cutting member by the operator. Additional control over the cutting operation is provided by having only a small surface area of shoulders on the block contacting the base plate during longitudinal movement of the block across the base plate.

The U-shaped work piece holder assembly on the front lateral side of the base plate provides an opening above the base plate to facilitate the movement of the cutting blade along the contour of the work piece. An adjustment slot is provided on the holder assembly to allow the operator considerable discretion in the placement of various sizes of molding on the cutting apparatus.

A most significant improvement in profile cutting control is provided by the present invention with a commensurate reduction in time necessary to complete precision cuts on the work piece. No complex machinery or templates are necessary.

BRIEF DESCRIPTION OF THE DRAWINGS

In the drawings, wherein like reference characters designate similar features throughout the various views to facilitate comparison.

DETAILED DESCRIPTION OF THE PREFERRED EMBODIMENT

Figure 1:
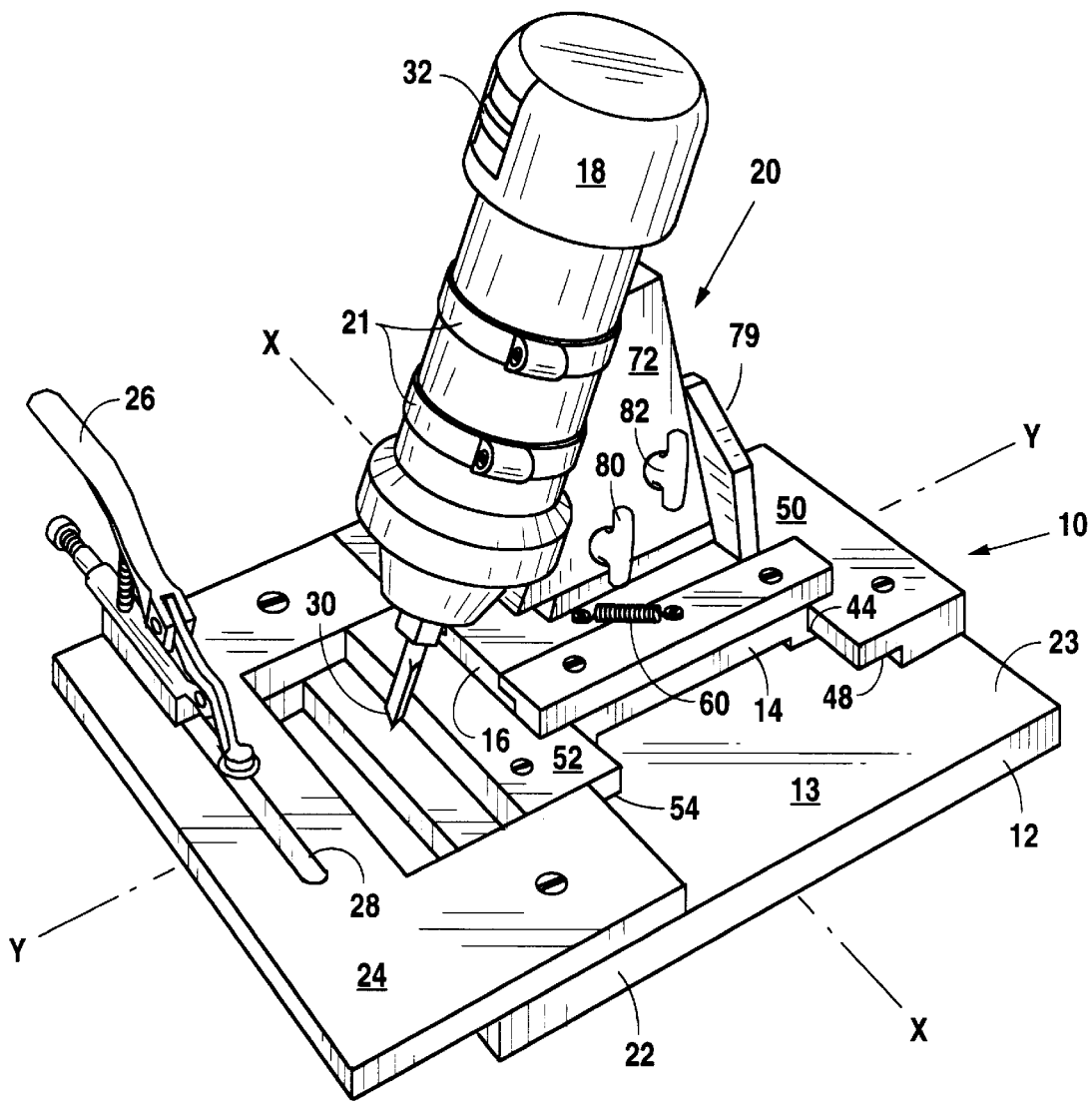
FIG. 1 is a perspective view of the present invention showing the longitudinal axis and transverse axis. The block is shown slid to one side of the base plate.

For the purposes of promoting an understanding of the principles of the invention, reference will now be made to the embodiments illustrated in the drawings and specific language will be used to describe the same. It will nevertheless be understood that no limitations of the scope of the invention is thereby intended, such alterations and further modifications in the illustrated device, and such further applications of the principles of the invention as illustrated therein, being contemplated as would normally occur to one skilled in the art to which the invention relates.

Referring now more particularly to FIG. 1, there is shown a work piece cutting apparatus (10) with a base plate (12) having a longitudinal axis (Y) and a transverse axis (X). Base plate (12) supports a longitudinally slidable block (14). A transversely slidable table (16) is supported by the block (14). A cutting member (18) is detachably mountable on an angular adjustment mounting bracket (20) by straps (21). Attached to the forward lateral side (22) of the base plate (12) is a U-shaped work piece holder assembly (24) having an adjustable clamp (26) mounted and secured by locking bolt (38) in a positioning slot (28) in the holder assembly (24).

The cutting member (18) has a depending blade (30) for cutting a profile on a contoured work piece as will be described below. The cutting member (18) is actuated by switch (32) and blade (30) is driven by reciprocating, oscillatory, or rotary motion. In the preferred embodiment, the cutting member (18) is a high speed rotary router with a routing bit (30).

Figure 1A:
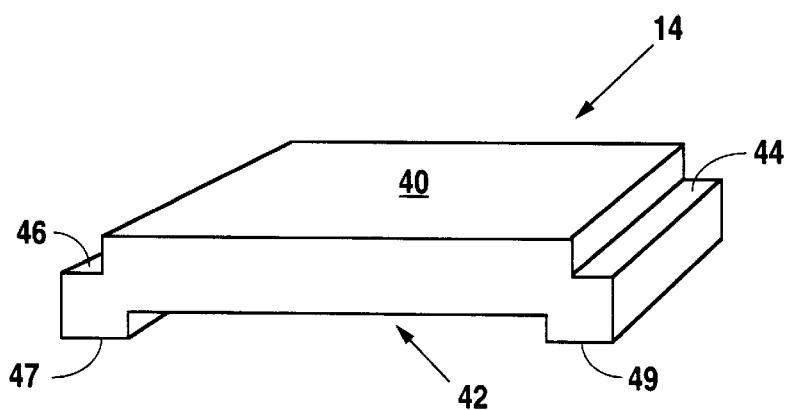
FIG. 1A illustrates a perspective view of the block of the present invention.

Base plate (12) has a generally flat planar surface (13) on which block (14) may slide longitudinally. FIG. 1A illustrates the construction of block (14) with a top surface (40), a bottom surface (42), first shoulder (44) extending along a lateral side of the block, and a second shoulder (46) extending along an opposite lateral side of the block. As may be seen in FIG. 1, shoulder (44) extends beneath an upper flange (48) of a block guide bracket (50) which is attached along a rearward lateral side (23) of base plate (12). In the same way, a second block guide bracket (52) is attached to the forward lateral side (22) of base plate (18) with its upper flange (54) retaining the second shoulder (46) of the block (14) there beneath in sliding engagement.

FIGS. 1 and 1A further illustrate how shoulders (44 and 46) support the bottom surface (42) of block (14) above and in spaced apart relationship from the surface (13) of the base plate (12). Thus, when the block (14) slides on the base plate, only the bottom surfaces (47 and 49) of the shoulders ride on the base plate. This reduces the frictional forces of the sliding movement and affords the craftsman with better control of the longitudinal movement of the cutting member (18) and its downwardly depending blade (30). This is valuable in ensuring that fine movement is provided in following the work piece contour to achieve the precision profile.

The transversely slidable table (16) is shown in FIG. 1 in its retracted position. Springs (60 and 62) on either side of the angular adjustment mounting bracket (20) pull the table (16) backward to a first starting position toward the rearward lateral side (23) of the base plate (12). During operation of the apparatus (10), the operator will move the blade (30) along the work piece by urging the cutting member (18) longitudinally and transversely. As the operator pushes the member (18) forward, the springs (60 and 62) provide a counteracting force seeking to bring the blade (30) back to the starting position. The employment of a means for balancing the operator's forward movement provides the present invention with greater operator control for the fine cutting of the coping or work piece contour.

The degree of "back cut" available in cutting the profile is controlled by the angular positioning of the blade (30). Mounting bracket (20) may be seen in FIG. 1 attached to table (16). However, greater detail may be seen in FIG. 2, which illustrates the apparatus (10) in a side elevation view. Mounting bracket (20) has a generally vertical arm (70) and a mounting sleeve (72). Two generally parallel and spaced apart arcuate slots (74 and 76) are formed in arm (70) and allow sleeve (72) to position the cutting member (18) mounted thereto by straps (21) to set the back cut angle of blade (30). The tip (31) of blade (30) acts as the pivot for the angular arc that may be provided. Almost any angular increment may be provided for the back cut by the unique arrangement of the angular mounting bracket (20). Tightening screws (80 and 82) pass through openings in the sleeve (72) and through the slots (74 and 76) respectively. Any common locking type screws may be used. It should be understood from the figures that by moving the sleeve (72) upwardly and downwardly along the arcuated slots, minute angular adjustments may be achieved.

Figure 2:
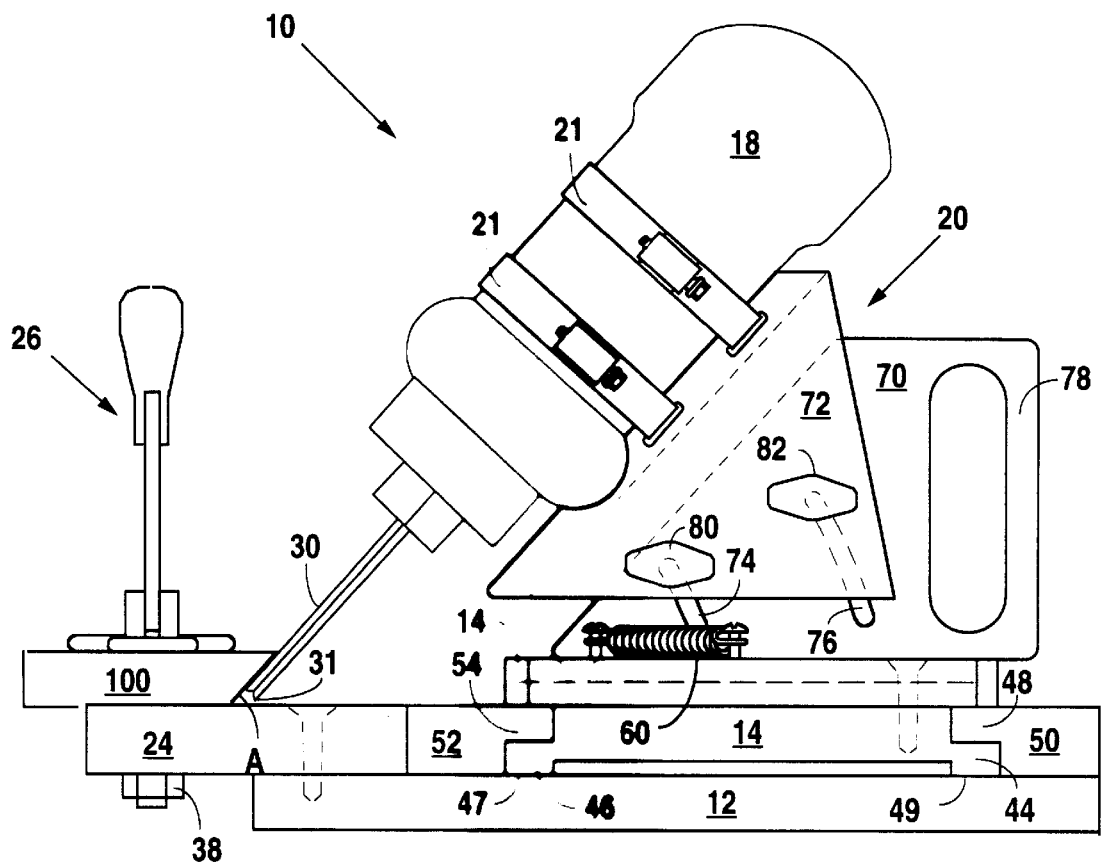
FIG. 2 illustrates a side elevation view of the present invention with the table urged slightly forward. An alternative guide handle is shown.

FIG. 2 further illustrates guide handle (78) which the operator uses to slide the cutting member (18) longitudinally and transversely. FIG. 1 shows another type of guide handle (79) mounted at the rearward side of the vertical arm (70).

Contoured molding work piece (100) is illustrated in FIG. 2 secured into position on work piece holder (24) by clamp (26) with locking bolt (38). Blade (30) is shown cutting back cut angle (A). Further, table (14) is shown urged forward slightly for transversely following the molding contour and cutting the proper profile. Spring (60) is slightly stretched resulting in a counter force on the table (16).

Figure 3:
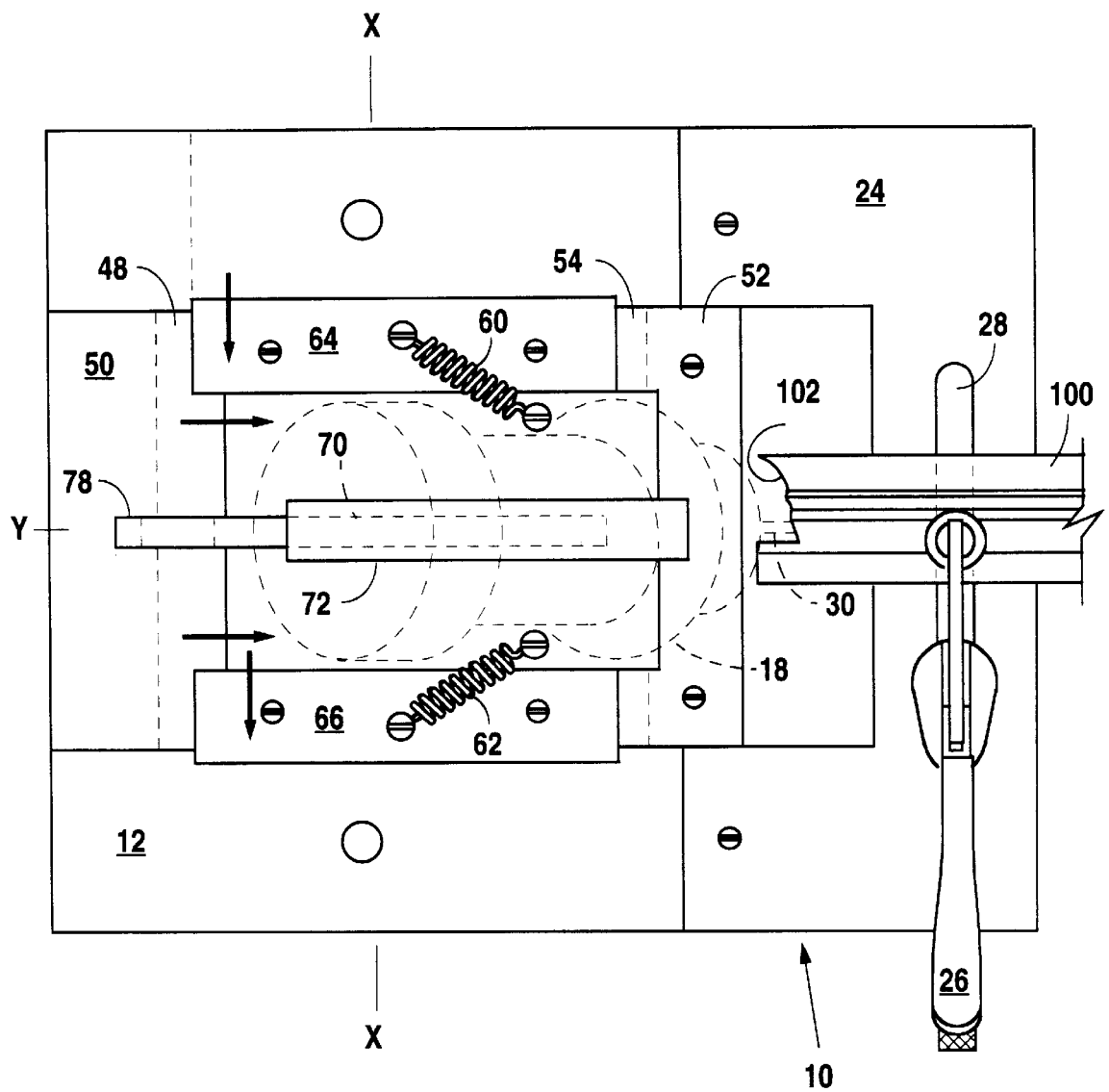
FIG. 3 shows a top plan view of the present invention with the cutting member shown in broken lines. A work piece is shown clamped in position and a partial profile cut completed. The block is slightly to one side and the table is urged slightly transversely forward.

Turning to FIG. 3, the apparatus of the present invention (10) is shown in a top plan view. The cutting member (18) is shown in broken lines simply to reduce the crowding in the figure. It may be seen that the cutting member (18) and blade (30) have cut a partial contour profile (102) on work piece (100). The block (14) has been shifted slightly toward one side of the base plate (12) and the table (16) has been urged slightly transversely forward. The direction arrows illustrate these shifts. Springs (60 and 62) are shown slightly stretched providing a counteracting force to control the transverse movement of the table (16).

Figure 4:
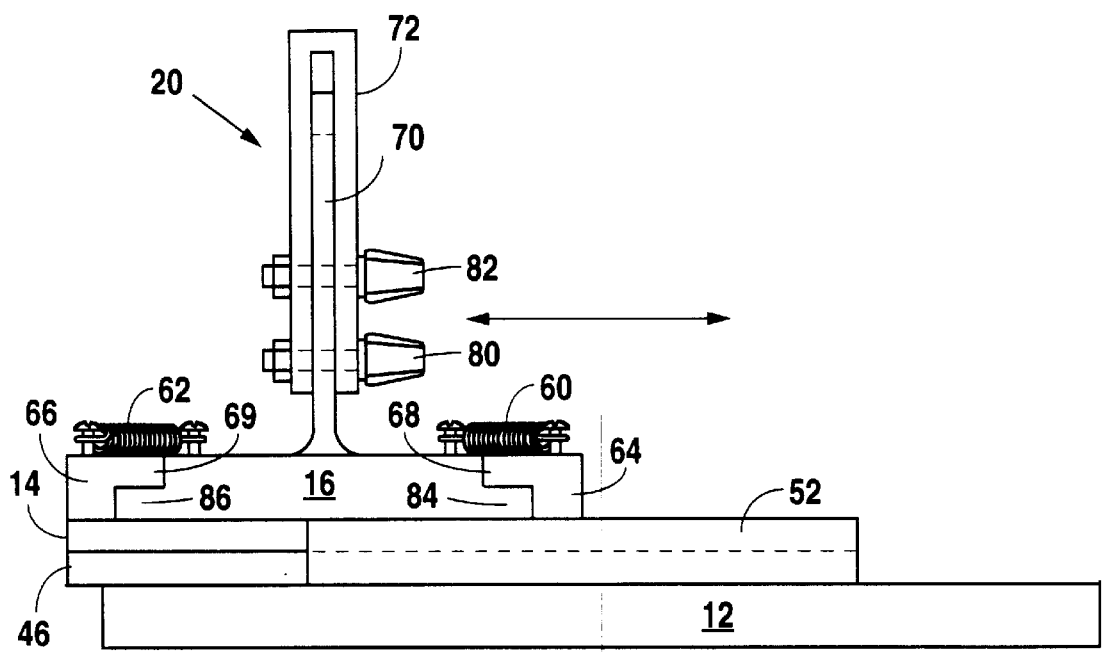
FIG. 4 illustrates a front elevation view of the present invention without the workpiece holder showing the block slid longitudinally to one side.

The transverse movement of the table (16) occurs between table guide brackets (64 and 66). As with block guide brackets (50 and 52), table guide brackets (64 and 66) each have upper flanges (68 and 69), respectively. FIG. 4 illustrates the spatial relationship of the flanges (68 and 69). Table (16) has transversely extending shoulders (84 and 86) which slide beneath the flanges (68 and 69) when the table (16) is urged forward by the operator or retracted back to the start position by retraction springs (60 and 62).

In FIG. 4, neither the cutting member (18) nor the work piece holder assembly (24) are shown so that it may be clearly understood how the table (16) is supported by and slides transversely on block (14). The front shoulder (46) of block (14) may be seen in FIG. 4, because the entire block (14) has been longitudinally slid to one side of the base plate (12). Further, in FIG. 4, the cooperation of separate elements of the angular adjustment mounting assembly (20) may be seen. The sleeve (72) is slidably fit over the vertical arm (70) and held in position by locking screws (80 and 82).

Figure 5:
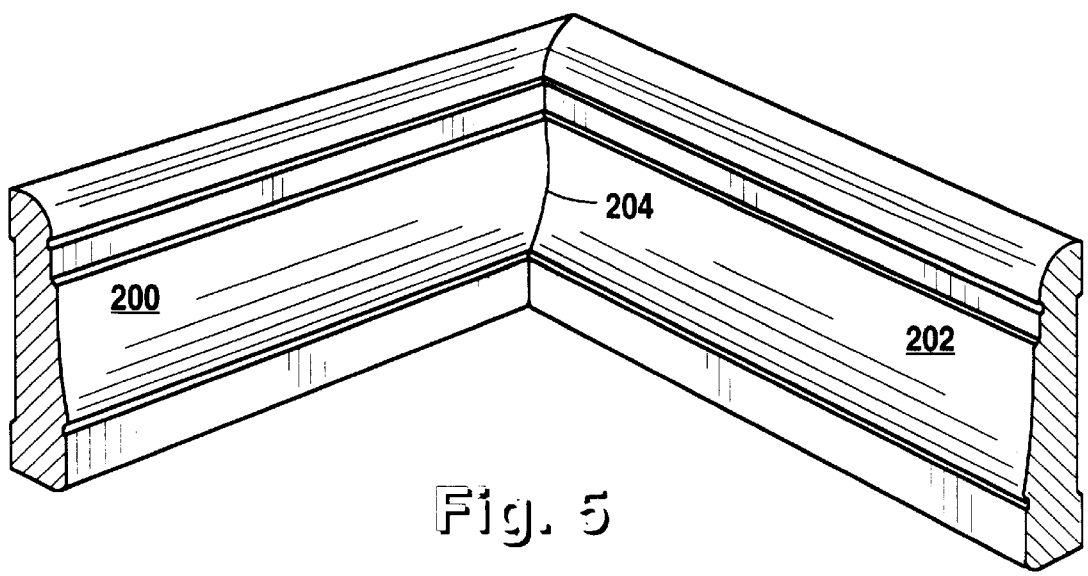
FIG. 5 illustrates a typical corner joint with one section of the molding work piece having a contour and a second section having an interconnecting corresponding profile pattern.

FIG. 5 illustrates a typical corner joint with one section of a contoured molding work piece (200) intersecting a second section (202) which has had a contour-corresponding profile pattern (204) cut into one end of the section (202) by use of the present cutting apparatus (10). One of ordinary skill in the art will readily understand the proper angle back cut needed to achieve a fine, flush fit of the mating sections.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A work piece cutting apparatus comprising:

a base plate;

a first guide bracket disposed at a first lateral side of said plate and a second guide bracket disposed at a second, opposite lateral side of said plate;

a block longitudinally slidable between said first and second brackets across said base plate there between;

a second pair of guide brackets disposed at opposite lateral sides of said block;

a table transversely slidable between said second pair of brackets across said block there between;

an angular adjustment mounting bracket affixed transversely across a central portion of said table and adapted to receive a cutting member having a depending blade; and a work piece holder disposed at said first lateral side of said base plate, said holder adapted to detachably secure a work piece thereto whereby movement of said cutting member longitudinally and transversely imparts angular cuts to said work piece.

2. The apparatus of claim 1 wherein said mounting bracket further comprises:
- a generally vertical arm having a first arcuate slot spaced apart from and generally parallel to a second arcuate slot;
- a mounting sleeve slidable over said vertical arm and having a first opening adapted to receive a first locking member and a second opening adapted to receive a second locking member, said first and second openings spaced apart and alignable with said first and second arcuate slots, said cutting member detachably securable to said mounting sleeve.

3. The apparatus of claim 1 wherein said block further comprises a first shoulder extending along a first lateral side of said block and a second shoulder extending along an opposite, second lateral side of said block, said first shoulder slidable beneath an upper flange of said first guide bracket and said second shoulder slidable beneath an upper flange of said second guide bracket, said first and second shoulders supporting a bottom surface of said block extending between said shoulders above and spaced apart from said plate.

4. The apparatus of claim 1 further comprising a table retraction member extending between said second pair of guide brackets and said table, said retraction member urging said table toward a first position.

5. The apparatus of claim 4 wherein said retraction member further comprises a first spring attached to a first of said second pair of guide brackets and to a first side of said mounting bracket; and a second spring attached to a second of said second pair of guide brackets and to a second side of said mounting bracket.

6. The apparatus of claim 2 further comprising a table retraction member.

7. The apparatus of claim 1 wherein said work piece holder further comprises a U-shaped member attached to said first lateral side of said base plate to provide an opening between said base plate and said work piece holder to receive said depending blade of said cutting member, and an elongated slot extending generally longitudinally within said U-shaped member and adapted to receive a clamp to detachably secure said work piece to said U-shaped member.

* * * * *